March 7, 1967  W. F. FELL  3,307,512
METHOD OF LOADING AND UNLOADING STORAGE TANKS IN VESSELS
Filed March 29, 1965
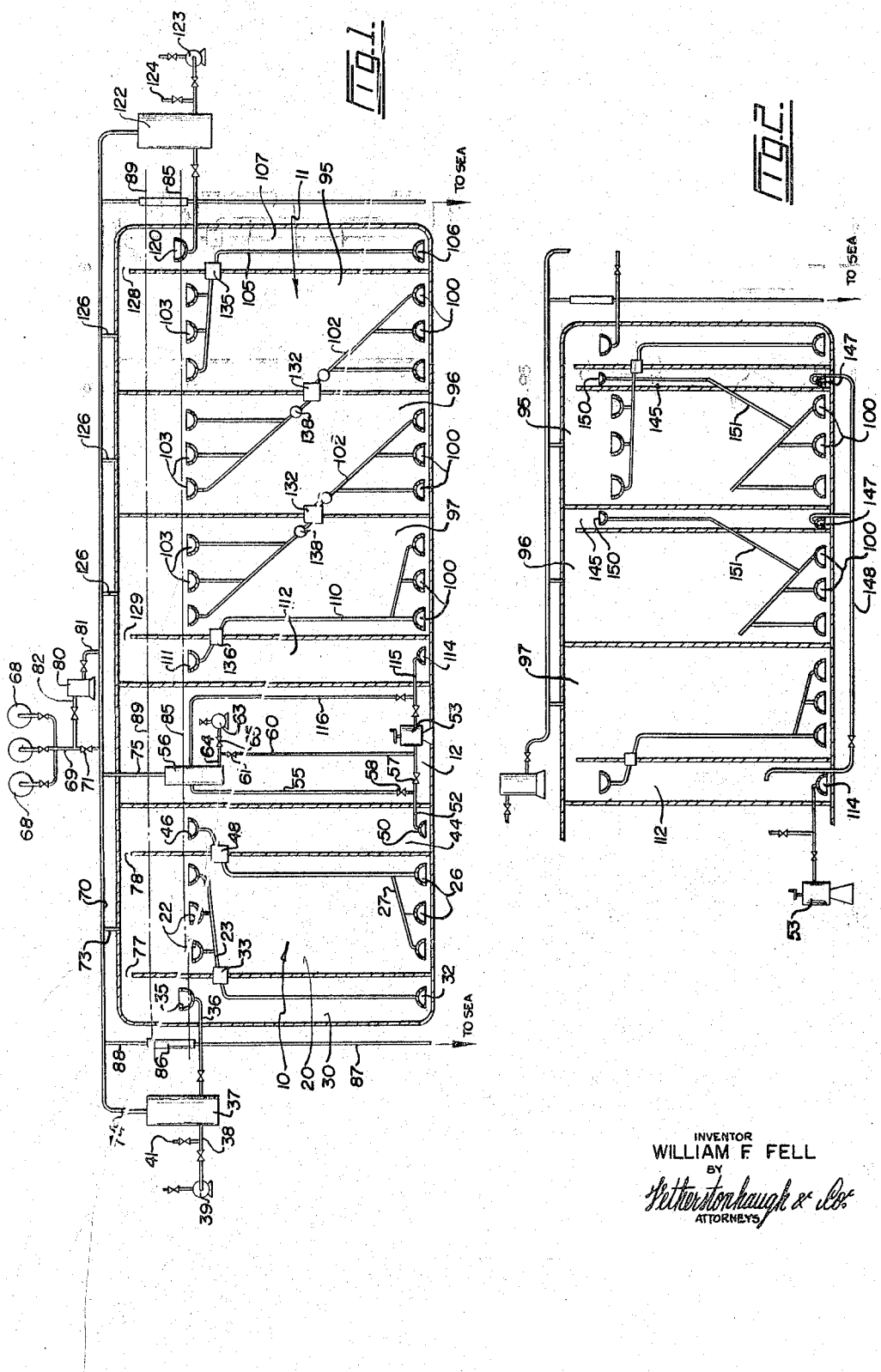
INVENTOR
WILLIAM F. FELL
BY
Fetherstonhaugh & Co.
ATTORNEYS

United States Patent Office 3,307,512
Patented Mar. 7, 1967

3,307,512
METHOD OF LOADING AND UNLOADING
STORAGE TANKS IN VESSELS
William F. Fell, 1763 Nelson St., Vancouver,
British Columbia, Canada
Filed Mar. 29, 1965, Ser. No. 443,514
29 Claims. (Cl. 114—74)

This invention relates to methods of loading and unloading storage tanks in vessels floating in water.

While this method is primarily designed for tankers and submarines used to transport liquids, and it is so described herein, it is to be understood that it may be used to load fuel oil into bunker tanks, the unloading taking place as the oil is consumed.

This method involves a liquid to be stored which floats on water and the water in which the vessel is floating, one of these being a first liquid and the other a second liquid. In simplest terms, the present method comprises starting with a tank in the vessel filled to a desired level with the first liquid and the lower part of the tank in communication through first inlet-outlet means with the water in which the vessel is floating, said tank having second liquid inlet-outlet means spaced above the level of said first inlet-outlet means, maintaining a gas pressure on the liquid on the tank to keep the vessel at a desired draft, usually the load draft of the vessel, while directing said second liquid into the tank to displace an equal weight of the first liquid therefrom. The gas used should be an inert gas, such as carbon dioxide. When considering a loading operation, the tank in the vessel is filled to a desired level with water, and the liquid to be stored, usually oil, is directed into the tank on top of the water to displace an equal weight of the latter. During unloading, the tank being filled to a desired level with the liquid being stored, as this liquid is pumped out, water enters the tank at the bottom thereof to displace said liquid. The gas pressure at the top of the tank is always maintained to keep the vessel at the desired draft.

In actual practice, the vessel can have a series of tanks with the lower part of each tank connected to the upper part of the next separate tank in the series, the first tank in the series being a head tank and the last tank being an end tank. The method starts with the tanks in the vessel filled to a desired level with the first liquid and the lower part of the end tank in communication through first inlet-outlet means with the water in which the vessel is floating, and said head tank having second inlet-outlet means spaced above the level of said first inlet-outlet means. The gas pressure in the tanks is maintained at a level to keep the vessel at a desired draft while the second liquid is directed into the tanks to displace an equal weight of the first liquid therefrom.

In the accompanying drawings,

FIGURE 1 is a diagram illustrating a vessel having the simplest form of loading and unloading apparatus including a single tank, and apparatus including a series of tanks, and FIGURE 2 diagrammatically illustrates an alternative arrangement in the series of tanks.

In actual practice, the vessel, such as a tanker or submarine, would have a plurality of independent series of tanks. Each series may be operated completely on its own, but it is preferable that they be connected to one or more common oil distributor tanks through which the oil entering and leaving the vessel passes. As it is desirable to separate any oil that becomes mixed with the water before the water leaves the vessel, the various series of tanks can be connected to a common separator tank through which all water entering and leaving the tank system flows.

Referring to the drawings, 10 indicates a single tank form of the present invention, while 11 designates a series tank form of the invention. For the sake of convenience, both forms are shown in a single drawing, apparatus 10 being located in one part of the drawing, while apparatus 11 being located in another, said systems being separated by a pump room 12 preferably located mid-ships.

Apparatus 10 includes a single storage tank 20 having oil inlet-outlet means near the top thereof which, in this example, consists of a plurality of U-shaped troughs 22 extending across the tank and connected to a common pipe 23. Although one trough only may be used, it is desirable to use a plurality of troughs in order to get a better distribution of oil across the top of the tank in order to draw oil from the entire cross section of the tank. Water inlet-outlet means is provided near the bottom of the tank, and in this example, the means comprises a plurality of inverted U-shaped troughs 26 connected to a common pipe 27. Although oil can be supplied to and removed directly from troughs 22, it is preferable to provide an oil inlet-outlet compartment 30 located beside and extending the height of tank 20. Pipe 23 of tank 20 extends to an inlet-outlet inverted U-shaped trough 32 at the bottom of compartment 30. If desired, a reverse flow pump 33 may be provided in pipe 23, or other means for assisting the movement of liquid in both directions through said pipe. A U-shaped inlet-outlet trough 35 is provided in the top of compartment 30, said trough being a little above the level of troughs 22. Trough 35 is connected by a pipe 36 to a distributor tank 37. Another pipe 38 extends to a pump 39 located in the vessel by means of which oil may be pumped into or out of tank 37. An addition pipe 41 is connected to pipe 38, said pipe 41 being adapted to be connected to lines from the shore through which oil can be pumped into or out of tank 37.

Water can be directed into and out of troughs 26 from outside the vessel, but it is preferable to provide a water inlet-outlet compartment 44 beside tank 20 extending the height thereof. Pipe 27 extends to a U-shaped trough 46 near the top of compartment 44 and preferably on the same level as troughs 22. A reverse flow pump 48 or other suitable means may be provided in pipe 27 for assisting the movement of fluid therethrough. A lower inverted U-shaped trough 50 is provided at the bottom of compartment 44, said trough being connected by a pipe 52 directly to a main sea valve 53 which communicates with the water outside the vessel. Another pipe 55 extends from pipe 52 to an oil-water separator tank 56, pipes 52 and 55 having control valves 57 and 58 therein. A pipe 60 extends from tank 56 to pipe 52 between valve 57 thereof and sea valve 53, said pipe 60 having a control valve 61 therein. If it is desired to pump water out of the system ashore rather than into the water in which the vessel floats, a pump 63 is provided, said pump being connected to tank 56 by a pipe 64 controlled by a valve 65. The outlet of pump 63 is adapted to be connected to a discharge hose.

A gas pressure is maintained in the upper part of tank 30 by a suitable system. A plurality of pressure gas tanks 68 are connected by a pipe 69 to a main 70, said pipe 69 having a control valve 71 therein. Main 70 is connected to the top portions of tanks 20, 37 and 56 by pipes 73, 74 and 75. As it is necessary to maintain pressure on top of compartments 30 and 44, main 70 can be connected to the tops of these compartments. However, in this example, compartments 30 and 44 are in communication with the top of tank 20 through openings 77 and 78, respectively.

During operation, valve 71 is opened to increase the gas pressure in main 70 and at the tops of the various tanks. When it is desired to lower the gas pressure in these tanks, a compressor 80 connected by pipes 81 and 82 to main 70 and tanks 68 is used to pump gas back into said tanks.

Apparatus 10 can be used alone, provided it is a complete unit in itself, as illustrated.

When it is desired to load oil into tank 20, you open sea valve 53 to allow water to enter compartment 44 through trough 50, to enter tank 20 through troughs 26 and to enter compartment 30 through trough 32. Gas pressure valve 71 is operated to direct gas into the tops of these tanks at a pressure to stop the flow of water thereinto when sufficient water has entered to load the vessel to a desired draft, usually its normal load draft. This level is indicated by line 85. It will be noted that line 85 is just above troughs 22 and 46, but that trough 35 opens above said line.

The level of liquid in tank 20 can be ascertained by means of a water gauge glass 86 connected to the water below the vessel by a pipe 87 and to gas main 70 by another pipe 88. If desired, a float-controlled valve arrangement may be provided in association with glass 86 for automatically controlling the gas pressure to maintain the desired liquid level.

The vessel is now ready for loading. Oil is pumped into distributor tank 37 either by pump 39 of the ship or by a pump located on shore. This oil is directed through trough 35 into compartment 30. As the oil flows into the compartment on top of the water therein said water is forced downwardly therein and out through trough 32 and pipe 23 into the top of tank 20. From here the water flows out through trough 26 and into the top of compartment 44 through trough 46. The water flows from this compartment through trough 50 and out through sea valve 53. The oil is pumped in until it approaches trough 50, at which time the pumping operation is terminated. As the oil is lighter than the water, the oil level at the top of tank 20 and of compartments 30 and 44 is higher than the water level, said oil level being indicated by line 89. This level will vary with the different types of oil pumped into the tank, but it is always above trough 35. Most of the time the water being discharged is directed straight to and out through valve 53, but as the oil approaches the top of compartment 44, it is preferable to direct the water through separator tank 56 in order that any oil therein can be removed therefrom before it is discharged into the sea through valve 53. If desired, the water can be pumped by pump 63 to sludge tanks ashore for the separation of oil therefrom.

If the oil is being transported, valve 53 can be closed during the voyage and opened only when it is desired to remove the oil from tank 20. However, in submarine tankers, valve 53 remains open at all times while the vessel is submerged in order to maintain the balance pressure inside and outside the vessel.

The unloading of the vessel is accomplished by pumping oil out of distributor tank 37 either by pump 39 or by a pump ashore, while sea valve 53 is open. As the oil is pumped out, the water follows, floating the oil progressively through compartment 44, tank 20 and compartment 30 up to near trough 35. This trough opens above the level of the water so that there is no danger of water entering trough 35 if the gas pressure is correct.

As the oil may be comparatively slow at certain periods in moving through pipes 27 and 23, pumps 33 may be used to help this movement in either direction. This is particularly helpful in increasing the capacity of the pipes and in preventing the main pumps that are moving the oil from getting ahead of the supply from the tank and compartments. However, if the pump suction from distributor tank 37 is float controlled, it can be used for several systems, without any gas reaching the discharge pump.

If the vessel is damaged at the bottom of tank 20 and/or compartments 30 and 44 so that water runs into them, the gas pressure can be increased therein to prevent the water from rising beyond a predetermined level, and this is a safety factor for the vessel.

Gauge 86 indicates the level of liquid in tank 20. When the water in the tank sinks the vessel to the desired depth, a mark is made on the frame of the glass gauge so that a person can tell whether the water level is above or below its correct position. If it is above or below, this can be corrected by adjusting the pressure of the gas in the top of the tank while sea valve 53 is open. A submarine tanker can load and discharge while submerged by increasing the gas pressure to bring the water level in the gauge to the mark on the frame. However, the gas pressure should be reduced before the submarine ascends in order to prevent oil spills.

It will be noted that the cross sectional area of each of compartments 30 and 44 is much smaller than that of tank 20. This keeps the oil-water contact surface as small as possible at the two places where the water and oil have to be separated. At the start of a loading operation, this oil-water contact surface is near trough 50, while at the final stage of unloading, it is near trough 35. In addition to this, the small cross sectional areas of compartments 30 and 44 reduce the volume of oil that has to be left in compartment 30 at the end of an unloading operation, and the volume of water that has to be left in compartment 44 at the end of a loading operation.

Apparatus 11 is the same as apparatus 10, excepting that instead of a single tank 20, apparatus 11 has a plurality of storage tanks, such as tanks 95, 96 and 97; 95 being a head tank and 97 an end tank. The bottom troughs 100 of each of tanks 95 and 96 are connected by pipes 102 to the upper troughs 103 of tanks 96 and 97 respectively. The upper troughs 103 of tank 95 are connected by pipe 105 to the lower trough 106 of oil inlet-outlet compartment 107. The bottom troughs 100 of tank 97 are connected by pipe 110 to the upper trough 111 of a water inlet-outlet compartment 112. The lower trough 114 of compartment 112 is connected through suitably valved pipes 115 and 116 to sea valve 53 and separator tank 56, respectively. The upper trough 120 of compartment 107 can be connected to distributor tank 37 but in this example, it is connected to a separate distributor tank 122. Oil can be pumped into and removed from tank 122 by a pump 123 on the ship or through a pipe 124 by a pump on shore. Gas main 70 is connected by pipes 126 to tanks 95, 96 and 97. Compartment 107 opens into the top of head tank 95 at opening 128, while the top of compartment 112 communicates with the top of end tank 97 through opening 129. Reverse flow pumps 132 are located in pipes 102, and similar pumps 135 and 136 are located in pipes 105 and 110 in order to increase the flow capacity of these pipes when desired.

If it is desired completely to shut compartments 95, 96 and 97 off from each other during a voyage, pipes 102 are provided with shut-off valves 138 for this purpose.

Apparatus 11 operates in the same manner as apparatus 10 excepting that when oil is directed over the water in the tanks, it flows progressively from compartment 107 through tanks 95, 96 and 97 into compartment 112, moving water ahead of it until the oil nears trough 114 in compartment 112. During unloading, oil is pumped out of compartment 107, during which time water flows through trough 114 into compartment 112 and follows underneath the oil progressively through tanks 97, 96 and 95, and into compartment 107 until it nears trough 120 of this compartment. The desired gas pressure is maintained in the tops of these tanks during this time.

FIGURE 2 illustrates a variation of apparatus 11 when used in a submarine in order to make it possible to balance the pressure inside the storage tanks relative to the outside pressure as the submarine travels at different depths.

As tank 97 can be brought into communication with the sea outside the vessel by opening sea valve 53 during submerged operation, the pressure in said tank is always equal to the sea pressure. However, in order to control the pressure in tanks 95 and 96 at this time, a small auxiliary water inlet-outlet compartment 145 is provided for each of these tanks. Each compartment 145 has a lower trough 147 connected by pipe 148 to the sea head above trough 114 in compartment 112 in order to provide more volume for oil and water to separate should a very quick ascent of the vessel result in oil entering troughs 100 in tanks 95 and 96. However, pipe 148 can be connected directly to sea valve 53. An upper trough 150 in each compartment 145 is connected by a pipe 151 to the lower troughs 100 of the respective tanks.

By keeping tank 97 in communication with the sea through compartment 112, and tanks 95 and 96 through auxiliary compartments 145, as the submarine moves downwardly, the pressure in the compartments will increase, and when the submarine moves upwardly, the pressure will decrease.

If desired, a quantity of a demulsifier can be maintained between the water and the oil. During loading, a quantity of demulsifier is pumped in ahead of the oil, and it can be left in the oil inlet-outlet compartment at the end of the unloading.

If it is desired to heat the oil for unloading purposes, some heaters can be provided adjacent the upper troughs in the storage tanks. This means that the oil as it is heated rises and travels with the discharge flow to the upper troughs and the adjacent tank or directly to the cargo pump, rather than contrary to the natural flow of the oil resulting from the heat as is the case when heaters are provided at the bottom of tanks in standard tankers where the cargo pumps draw oil from a very small part of the extensive area of the bottom of the tank which is cooled by the sea, making it very difficult to heat the oil flowing to the pump.

Some advantages resulting from the present apparatus and method of loading and unloading liquid cargo are as follows:

(a) The absence of tank hatches, atmospheric vents, or other openings in the deck in way of the cargo tanks, and the use of an inert gas, very greatly reduces the possibilities of explosions or fire, greatly reduces corrosion inside the tanks, eliminates the evaporation of cargo, and by increasing the gas pressure to force back to the sea any sea water that enters a damaged tank, this type of vessel has self-salvage capabilities and can remain afloat close to the normal draft, even when subjected to very extensive bottom damage.

(b) The loading and discharging of liquid cargo or bunkers in a surface or submerged tanker while adjusting the gas pressure to maintain the vessel at a constant weight, maintains a hydrostatic balance inside and outside he vessel.

(c) The vessel can be loaded and unloaded with considerably less opening and closing of valves than in conventional tankers, and considerable less piping is required.

(d) The water moving upwardly in each tank during unloading washes the bottom and the walls thereof so that practically all of the oil is floated out of each tank. The oil removed from the walls as cargo is oil that usually mixes with ballast to cause much of the oil pollution from conventional tankers.

(e) The inert gas considerably reduces corrosion since it helps to keep oxygen away from the metal walls of the tanks. As the weight of liquid remains the same while loading and unloading, the bulkheads and the hull structure of the vessel are not subjected to the loading and discharge stresses experienced by conventional tankers. The little corrosion and the reduced hull stresses enable lighter steel construction to be used.

(f) The storage tanks can be completely isolated from each other during travel in order to comply with vessel subdivision requirements.

(g) Ballasting automatically takes place during unloading, and is automatically removed during loading. Float indicators in each tank showing how much the oil level rises and falls relative to the water level can indicate the progress in load and discharging.

(h) The method permits the cargo liquid always to be removed from the tops of the tanks and the ballast water from the bottoms thereof. This reduces the possibility of foreign material being drawn off with the cargo during unloading, and as each tank acts somewhat as a sump, sludge is moved out of the tank when ballast water is pumped from the bottom of the tank or tanks, such as during a ballast voyage.

(i) Any oil freeing itself from the structure during a ballast voyage will remain on top of the water until it joins with the next oil cargo when the latter reaches the tank. Tank cleaning can be speeded up by raising the water level in each tank so that any oil on top of the ballast water can be floated out at the top of the tank by means of a special pipe connection for this purpose.

What I claim as my invention is:

1. Apparatus for storing liquids that float on water in vessels floating in water, comprising a tank in a vessel, means for maintaining said tank in communication with the water in which the vessel is floating, means for directing storage liquid into and out of the tank, said water being forced out and flowing back into the tank as said liquid is respectively directed into and out of the tank, and means for maintaining a gas pressure on liquid in the tank sufficient to keep the liquid at a level with a space above said liquid and to keep the vessel at a desired draft during movement of liquid into and out of said tank, said storage liquid directing means being positioned to draw liquid from the tank just below said liquid level.

2. Apparatus for storing liquids that float on water in vessels floating in water, comprising a tank in a vessel, means for maintaining the bottom of said tank in communication with the water in which the vessel is floating, means for directing storage liquid into and out of the tank near but spaced below the top thereof, said water being forced out and flowing back into the tank as said liquid is respectively directed into and out of the tank, and means for maintaining a gas pressure on liquid in the tank sufficient to keep the liquid level just above said liquid directing means and to keep the vessel at a desired draft during movement of liquid into and out of said tank.

3. Apparatus for storing liquids that float on water in vessels floating in water, comprising a tank in a vessel, liquid inlet-outlet and water inlet-outlet compartments in the vessel of the same height as the tank, first pipe means extending from near the top of the water compartment to near the bottom of the tank, second pipe means extending from near the top of the tank to near the bottom of the liquid compartment, means for directing storage liquid into and out of the top of the liquid compartment, whereby said liquid can flow into the liquid and water compartments and the tank, means for maintaining the bottom of said water compartment in communication with the water in which the vessel is floating whereby water can flow into the water and liquid compartments and the tank, the water being forced out of and flowing back into said compartments and tank as said liquid is respectively directed into and out of the compartments and tank, and means for maintaining a gas pressure on liqiud in the liquid and water compartments and the tank sufficient to keep the vessel at a desired draft during movement of liquid into and out of said tank and compartments.

4. Apparatus as claimed in claim 3 in which the first pipe means extends from an upper trough extending across the water compartment near its top to at least one inverted lower trough extending across the tank near the bottom thereof, and the second pipe means extends from at least one upper trough extending across the tank near its top to an inverted lower trough extending across the liquid compartment near the bottom thereof.

5. Apparatus as claimed in claim 4 including means in each of the first and second pipe means operable to assist the movement of liquid in either direction through the respective pipe means.

6. Apparatus as claimed in claim 4 in which all of the upper troughs are in substantially the same level and said level is below the level of water in the tank and compartments when the vessel is at the desired draft.

7. Apparatus as claimed in claim 4 in which the means for directing storage liquid into and out of the liquid compartment includes an upper trough extending across said compartment near the top thereof.

8. Apparatus as claimed in claim 6 in which the means for directing storage liquid into and out of the liquid compartment includes an upper trough extending across said compartment near the top thereof, said compartment trough being above said water level but below the level of said liquid in the tank and compartments when the vessel is at the desired draft.

9. Apparatus as claimed in claim 7 including pipe means connecting the upper trough of the liquid compartment to a distributor tank into and out of which liquid is pumped.

10. Apparatus as claimed in claim 4 in which the means for maintaining the water compartment in communication with the water in which the vessel is floating includes an inverted trough extending across said water compartment near the bottom thereof.

11. Apparatus for storing liquids that float on water the vessels floating in water, comprising a series of tanks, the first tank in the series being a head tank and the last tank being an end tank, pipe means extending from near the bottom of each tank beginning with the head tank to near the top of the next tank along the series, means for maintaining the bottom of said end tank in communication with the water in which the vessel is floating whereby water can flow into all of the tanks, means for directing storage fluid into and out of the head tank near the top thereof whereby said liquid can flow into all of the tanks, said water being forced out and flowing back into the tanks as said liquid is respectively directed into and out of the tanks, and means for maintaining a gas pressure on liquid in the tanks sufficient to keep the vessel at a desired draft during movement of liquid into and out of said tanks.

12. Apparatus as claimed in claim 11 in which said means for directing fluid into and out of the head tank includes a liquid inlet-outlet compartment near said head tank and the same height as the latter, pipe means extending from near the bottom of the liquid compartment to near the top of the head tank, and pipe means near the top of said compartment through which liquid is directed into and out of the liquid compartment; and said means for maintaining the end tank in communication with the water in which the vessel is floating includes a water inlet-outlet compartment near and the same height as the end tank, pipe means extending from near the bottom of the end tank to near the top of the water compartment, and pipe means near the bottom of said water compartment extending to the water outside the vessel.

13. Apparatus as claimed in claim 11 in which the pipe means extending between each tank and the next tank along the series extends from at least one inverted lower trough extending across said each tank near the bottom thereof to at least one upper trough extending across said next tank near the top thereof, all of said upper troughs being in substantially the same planes and below the level of water in the tanks when the vessel is at said desired draft.

14. Apparatus as claimed in claim 13 in which said means for directing fluid into and out of the head tank includes a liquid inlet-outlet compartment near said head tank and the same height as the latter, pipe means extending from near the bottom of the liquid compartment to near the top of the head tank, and pipe means near the top of said compartment through which liquid is directed into and out of the liquid compartment; and said means for maintaining the end tank in communication with the water in which the vessel is floating includes a water inlet-outlet compartment near and the same height as the end tank, pipe means extending from near the bottom of the end tank to near the top of the water compartment, and pipe means near the bottom of said water compartment extending to the water outside the vessel.

15. Apparatus as claimed in claim 14 in which the pipe means extending from the liquid compartment to the head tank extends from an inverted lower trough extending across the liquid compartment near the bottom thereof to at least one upper trough extending across said head tank near the top thereof, and said pipe means extending from the end tank to the water compartment extends from at least one lower trough extending across the end tank near the bottom thereof to an upper trough extending across the water compartment near the top thereof.

16. Apparatus as claimed in claim 14 in which the means for directing storage liquid into and out of the liquid compartment includes an upper trough extending across said compartment near the top thereof.

17. Apparatus as claimed 14 in which the means for maintaining the water compartment in communication with the water in which the vessel is floating includes an inverted trough extending across said water compartment near the bottom thereof.

18. Apparatus as claimed in claim 13 in which all said upper troughs are in substantially the same level and said level is below the level of water in the tank and compartments when the vessel is at the desired draft.

19. Apparatus as claimed in claim 14 in which all of the upper troughs of the tank and the upper trough of the water compartment are in substantially the same level and said level is below the level of water in the tank and compartments when the vessel is at the desired draft.

20. Apparatus as claimed in claim 19 in which the upper trough of the liquid compartment is above said water level but below the level of said liquid in the liquid compartment when the vessel is at the desired draft.

21. Apparatus as claimed in claim 13 in which each pipe means extending from a tank to the next tank along the series includes means operable to assist the movement of liquid in either direction through said each pipe means.

22. Apparatus as claimed in claim 14 in which the pipe means extending from the liquid compartment to the head tank includes means operable to assist the movement of liquid in either direction through said pipe means.

23. Apparatus as claimed in claim 14 in which the pipe means extending from the end tank to the water compartment includes means operable to assist the movement of liquid in either direction through said pipe means.

24. Apparatus for storing liquids that float on water in vessels floating in water, comprising a tank in a vessel, means for maintaining the bottom of said tank in communication with the water in which the vessel is floating, at least one upper trough extending across the tank near but spaced below the top thereof, pipe means opening into each upper trough and extending out of the tank for direcing storage liquid through the trough into and out of the tank, said water being forced out and flowing back into the tank as said liquid is respectively directed into and out of the tank, and means for maintaining a gas pressure on liquid in the tank sufficient to keep the liquid at a level just above the trough and to keep the vessel at a desired draft during movement of liquid into and out of said tank.

25. Apparatus as claimed in claim 24 in which said means for maintaining the bottom of the tank in communication with the water comprises at least one inverted lower trough extending across the tank near the bottom thereof, and pipe means opening into each lower trough and extending out of the tank and communicating with said water.

26. Apparatus as claimed in claim 2 in which said means for directing storage liquid into and out of the tank includes a liquid inlet-outlet compartment near and the same height as said tank, pipe means extending from near the bottom of the liquid compartment to near the top of the tank, and pipe means near the top of said compartment through which liquid is directed into and out of the compartment.

27. Apparatus as claimed in claim 26 including means maintaining the tops of the tank and the liquid compartment in communication with each other above the liquid therein.

28. Apparatus as claimed in claim 2 in which said means for maintaining the tank in communication with the water includes a water inlet-outlet compartment near and the same height as the tank, pipe means extending from near the bottom of the tank to near the top of the water compartment, and means near the bottom of said water compartment maintaining the latter in communication with the water outside the vessel.

29. Apparatus as claimed in claim 28 including means for maintaining the tops of the tank and the water compartment in communication with each other above the liquid therein.

References Cited by the Examiner

UNITED STATES PATENTS

| | | | |
|---|---|---|---|
| 1,710,006 | 4/1929 | Peter | 114—74 |
| 2,631,558 | 3/1953 | Harris | 114—74 X |
| 2,889,795 | 6/1959 | Parks | 114—125 X |

FOREIGN PATENTS

| | | |
|---|---|---|
| 14,762 | 1914 | Great Britain. |

MILTON BUCHLER, *Primary Examiner.*

T. M. BLIX, *Assistant Examiner.*